Figures 1, 2, 3:
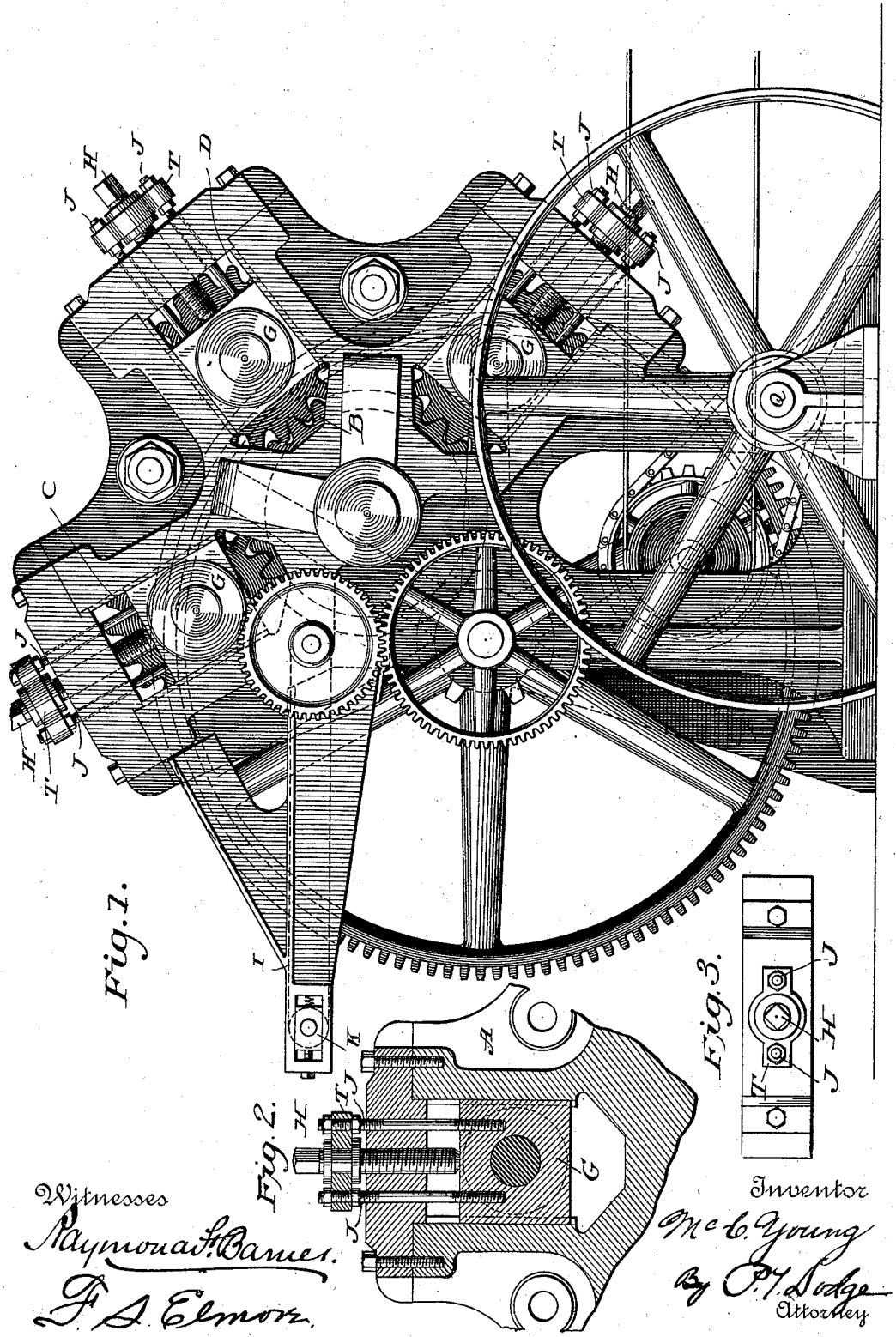

(No Model.)

McCLINTOCK YOUNG.
ADJUSTABLE BEARING.

No. 542,580. Patented July 9, 1895.

Witnesses
Raymond F. Barnes.
F. S. Elmore.

Inventor
Mc C. Young
By P. T. Dodge
Attorney

UNITED STATES PATENT OFFICE.

McCLINTOCK YOUNG, OF FREDERICK, MARYLAND.

ADJUSTABLE BEARING.

SPECIFICATION forming part of Letters Patent No. 542,580, dated July 9, 1895.

Application filed February 10, 1894. Serial No. 499,806. (No model.)

*To all whom it may concern:*

Be it known that I, McCLINTOCK YOUNG, of Frederick, county of Frederick, and State of Maryland, have invented a new and useful Improvement in Adjustable Bearings for Shafts, of which the following is a specification.

This invention has reference to a bearing for shafts, rolls, &c.; and it consists in peculiar devices for quickly effecting the adjustment of the bearing and for maintaining the same rigidly in position.

In the drawings for the sake of clearness I have represented my improved bearing as applied to a machine for disintegrating or separating fibrous substances. This machine embodies a series of coacting crushing-rolls, and it frequently happens that the positions of these rolls require to be adjusted on account of the character of the substances under treatment. Hence my invention is peculiarly applicable to machines of this character. It will be understood, however, that the invention is not to be confined in its application to these machines; but it may be employed wherever it is desired to provide for the adjustment of the shaft or roll, as the case may be.

In the accompanying drawings, Figure 1 is an elevation, partly in section, of a disintegrating-machine having my invention embodied therein. Fig. 2 is a section through one of the adjustable bearings and adjacent parts of the frame. Fig. 3 is a top plan view of the same.

Referring to the drawings, the machine represented in the drawings comprises, primarily, a series of four fluted intermeshing crushing-rolls B, C, D, and E, which may be driven in any suitable manner. The central roll B is mounted in fixed bearings in a suitable frame A, which gives support to the operative parts of the machine, while the other rolls have their journals mounted in bearings G, arranged to slide inward and outward in relation to the central roller. These bearings are adjusted in the peculiar manner now to be described and which constitutes my invention. Each of the bearings consists of a block mounted to slide inward and outward in suitable guides formed in the frame. Each block is connected to the inner ends of two rods J, which extend outward loosely through openings in the frame and have their opposite ends fixed to a collar T, the construction being such that the rods may be moved inward and outward through the openings in the frame, which action will positively move the bearing inward and outward in its guides. In order to effect this movement of the rods and the bearing connected thereto, I swivel in the collar T between the two rods an adjusting-screw H, which is threaded into the frame and has its inner end arranged to bear against the bearing, as plainly shown in Fig. 2. The outer end of this screw is formed to receive a turning-wrench by which it may be screwed into the frame to force the block inward or screwed out to withdraw the same.

From the foregoing description it will be observed that the adjustment of the bearing-block may be easily and quickly effected by simply turning the screw H, the two rods J constituting a connection between the same and the block. By reason of the fact that the inner end of the screw bears at all times against the block, the latter will be positively and fixedly held in the position to which it is adjusted, so that there will be no liability of the roll changing its position under undue pressure or from other causes.

In the operation of the machine the fiber is introduced by an apron I between the rolls B C, whence it passes between the rolls D, E, and B, thence onto a delivery-apron V, by which it is carried from the machine.

Having thus described my invention, what I claim, is—

The combination of the main frame, the roll C, the movable journal bearings G, the screws H, working against the said bearings to advance the same, the collars swiveled on said screws, and connections between said collars and bearings for positively withdrawing the latter when the screws are withdrawn.

In testimony whereof I hereunto set my hand this 8th day of January, 1894, in the presence of two attesting witnesses.

McCLINTOCK YOUNG.

Witnesses:
MARSHALL FOUT,
CHS. C. SMITH.